US008731083B2

(12) United States Patent
Sakai et al.

(10) Patent No.: US 8,731,083 B2
(45) Date of Patent: May 20, 2014

(54) RECEIVER AND SIGNAL RECEIVED POWER ESTIMATION METHOD

(75) Inventors: Masahito Sakai, Minato-ku (JP); Koichi Tamura, Minato-ku (JP); Quang Nguyen, Mulgrave (AU); Chaitanya Rao, Mulgrave (AU)

(73) Assignees: NEC Corporation, Tokyo (JP); NTT DoCoMo, Inc., Tokyo (JP)

( * ) Notice: Subject to any disclaimer, the term of this patent is extended or adjusted under 35 U.S.C. 154(b) by 83 days.

(21) Appl. No.: 13/579,241

(22) PCT Filed: Feb. 10, 2011

(86) PCT No.: PCT/JP2011/052840
§ 371 (c)(1),
(2), (4) Date: Oct. 4, 2012

(87) PCT Pub. No.: WO2011/102289
PCT Pub. Date: Aug. 25, 2011

(65) Prior Publication Data
US 2013/0034191 A1    Feb. 7, 2013

(30) Foreign Application Priority Data
Feb. 16, 2010  (JP) .................................. 2010-030799

(51) Int. Cl.
    *H04K 1/10*    (2006.01)
(52) U.S. Cl.
    USPC ......................................................... 375/260
(58) Field of Classification Search
    USPC ........................... 375/345, 362, 260, 224, 227
    See application file for complete search history.

(56) References Cited

U.S. PATENT DOCUMENTS

| 2009/0092178 | A1* | 4/2009 | Sayana et al. | 375/227 |
| 2009/0116599 | A1* | 5/2009 | McCoy | 375/362 |
| 2011/0103367 | A1 | 5/2011 | Ishii | |
| 2013/0286866 | A1* | 10/2013 | Hammarwall et al. | 370/252 |
| 2013/0301456 | A1* | 11/2013 | Siomina et al. | 370/252 |

FOREIGN PATENT DOCUMENTS

| JP | 2004-140489 A | 5/2004 |
| JP | 2004-193670 A | 7/2004 |
| JP | 2006-13915 A | 1/2006 |
| WO | 2009/022668 A1 | 2/2009 |

OTHER PUBLICATIONS

3rd Generation Partnership Project; Technical Specification Group Radio Access Network; Evolved Universal Terrestial Radio Access Network (E-UTRAN); Physical layer—Measurements (release 8), 3GPP TS 36.214 V8.5.0, Dec. 2009, pp. 1-11.

(Continued)

*Primary Examiner* — Jaison Joseph
(74) *Attorney, Agent, or Firm* — Sughrue Mion, PLLC

(57) ABSTRACT

In the case of a narrow band in which the number of sub-carriers to be used for the concurrent transmission is smaller than a predetermined value, an RSRP estimation unit carries out processes in an order of time-wise in-phase addition, frequency-wise averaging, and conjugate multiplication, with respect to the channel estimation values estimated by the channel estimation unit; and in the case of a wide band in which the number of sub-carriers to be used for the concurrent transmission is greater than the predetermined value, the RSRP estimation unit carries out processes in an order of frequency-wise averaging, conjugate multiplication, and time-wise in-phase addition, with respect to the channel estimation values estimated by the channel estimation unit.

8 Claims, 3 Drawing Sheets

(56) References Cited

OTHER PUBLICATIONS

Shunsuke Seo, et al., "An Investigation on SIR Measurement Methods in Adaptive Transmit Power Control for DS-CDMA", Institute of Electronics, Information and Communication Engineers—Society Conference, 1996, 1 page.

Toshiaki Ohnishi, et al., "A Study on Received SINR Estimation Technique for OFDM Adaptive Modulation-based One-Cell Reuse TDMA Systems", Institute of Electronics, Information and Communication Engineers—Technical Report, Apr. 2006, pp. 1-6, RCS2006-6.

3rd Generation Partnership Project; Technical Specification Group Radio Access Network; Evolved Universal Terrestial Radio Access Network (E-UTRAN); Requirements for support of radio resource management (release 8), 3GPP TS 36.133 V8.6.0, May 2009, pp. 1-258.

* cited by examiner

RECEIVER AND SIGNAL RECEIVED POWER ESTIMATION METHOD

CROSS REFERENCE TO RELATED APPLICATIONS

The present application is a national phase of an International application No. PCT/JP2011/052840 filed on Feb. 10, 2011, which relates to and claims priority from Japanese patent application No. 2010-030799 filed on Feb. 16, 2010. The contents of the International application and the Japanese application are incorporated herein by reference.

TECHNICAL FIELD

The present invention relates to a receiver for receiving information transmitted concurrently by using a plurality of sub-carriers (sub-carrier waves), and a method of estimating reference signal received power (RSRP), the method being used by the receiver.

BACKGROUND ART

An Orthogonal Frequency Division Multiplexing (OFDM) method, such as Long Term Evolution (LTE), standardized by 3rd Generation Partnership Project (3GPP) attracts attention as a communication method for the next generation. In a communication method such as LTE, a receiver needs to report reference signal received power (RSRP) to a higher-level layer, as stipulated in NPL1. On the basis of such information as RSRP that a receiver estimates, it is judged whether a handover process is performed between base stations or not. In order to perform the handover process with an appropriate base station, it is needed to improve the accuracy of power estimation by the receiver.

In a conventional communication method of Code Division Multiple Access (CDMA), a measurement of RSRP is performed by way of in-phase addition of pilot signals after Rake combining, for example, as described in NPL2. Then, in order to improve the estimation accuracy, proposed are, for example, a method of estimating RSRP with a high degree of accuracy by using a signal before Rake combining, as described in PTL1; as well as another method that applies a value with high accuracy while concurrently using in-addition and root-mean-square of received signals, as described in PTL2.

Unfortunately, in a communication method of OFDM for concurrently transmitting information by using a plurality of sub-carriers (sub-carrier waves), channel estimation values turns if an offset exists on the timing of FFT (Fast Fourier Transformation). Therefore, if in-phase addition is performed with those channel estimation values as they are, sometimes RSRP may be estimated to be smaller than it should actually be. FIG. 5 shows such an example. NPL3 discloses an introduction of a method in which in-phase addition is performed after conjugate multiplication between neighboring channel estimation values, for solving such a challenge.

On the other hand, LTE needs to estimate RSRP with accuracy stipulated in NPL4. Meanwhile, it is difficult for the method disclosed in NPL3 to estimate RSRP with accuracy that meets those stipulated specifications.

CITATION LIST

Patent Literature

PTL1: JP2004-140489A
PTL2: JP2006-13915A

Non Patent Literature

NPL1: 3GPP, TS 36.214 v8.5.0, December 2008
NPL2: Shunsuke SEO, Yukihiko OKUMURA, and Tomohiro DOHI; "An Investigation on SIR Measurement Methods in Adaptive Transmit Power Control for DS-CDMA", Institute of Electronics, Information and Communication Engineers—Society Conference, 1996 B-330, 1996
NPL3: Toshiaki OHNISHI, and Seiichi SAMPEI; "A Study on Received SINR Estimation Technique for OFDM Adaptive Modulation-based One-Cell Reuse TDMA Systems", Institute of Electronics, Information and Communication Engineers—Technical Report, RCS2006-6, April 2006
NPL4: 3GPP, TS 36.133 v8.6.0, May 2009

SUMMARY OF INVENTION

Technical Problem

Thus, it is an object of the present invention to provide a receiver and a method of estimating RSRP that can materialize a high degree of accuracy in estimating RSRP.

Solution to Problem

According to a first aspect of the present invention, provided is a receiver for receiving information transmitted concurrently by using a plurality of sub-carriers, including: a channel estimation unit for calculating a channel estimation value with respect to each of the plurality of sub-carriers; and a RSRP estimation unit for estimating RSRP of the information on the basis of channel estimation values calculated by the channel estimation unit; wherein, in the case of a narrow band in which the number of sub-carriers to be used for the concurrent transmission is smaller than a predetermined value, the RSRP estimation unit carries out processes in an order of time-wise in-phase addition, frequency-wise averaging, and conjugate multiplication, with respect to the channel estimation values estimated by the channel estimation unit; and in the case of a wide band in which the number of sub-carriers to be used for the concurrent transmission is greater than the predetermined value, the RSRP estimation unit carries out processes in an order of frequency-wise averaging, conjugate multiplication, and time-wise in-phase addition, with respect to the channel estimation values estimated by the channel estimation unit.

According to a second aspect of the present invention, provided is a method of estimating RSRP for estimating reference signal received power of information after receiving the information transmitted concurrently by using a plurality of sub-carriers, comprising: carrying out processes in an order of time-wise in-phase addition, frequency-wise averaging, and conjugate multiplication, with respect to a channel estimation value for each of the sub-carriers, in the case of a narrow band in which the number of sub-carriers to be used for the concurrent transmission is smaller than a predetermined value; and carrying out processes in an order of frequency-wise averaging, conjugate multiplication, and time-wise in-phase addition, with respect to a channel estimation value for each of the sub-carriers, in the case of a wide band in which the number of sub-carriers to be used for the concurrent transmission is greater than the predetermined value.

Advantageous Effect of Invention

According to the present invention, time-wise in-phase addition is introduced, and the number of samples to be used in an in-phase addition process is increased. Meanwhile, a frequency-wise averaging process is introduced, and smoothing operation on channel estimation values is carried out in advance, so that the effect of noise is mitigated. According to these means, the accuracy in estimating RSRP is improved. Moreover, in the case of a wide band in which the sufficient number of samples for in-phase addition can be used, the amount of data that a receiver buffers is reduced by means of changing the processing order.

DESCRIPTION OF EMBODIMENTS

Preferred embodiments of the present invention are explained below with reference to the accompanied drawings.

(Configuration Example)

Figure 1:
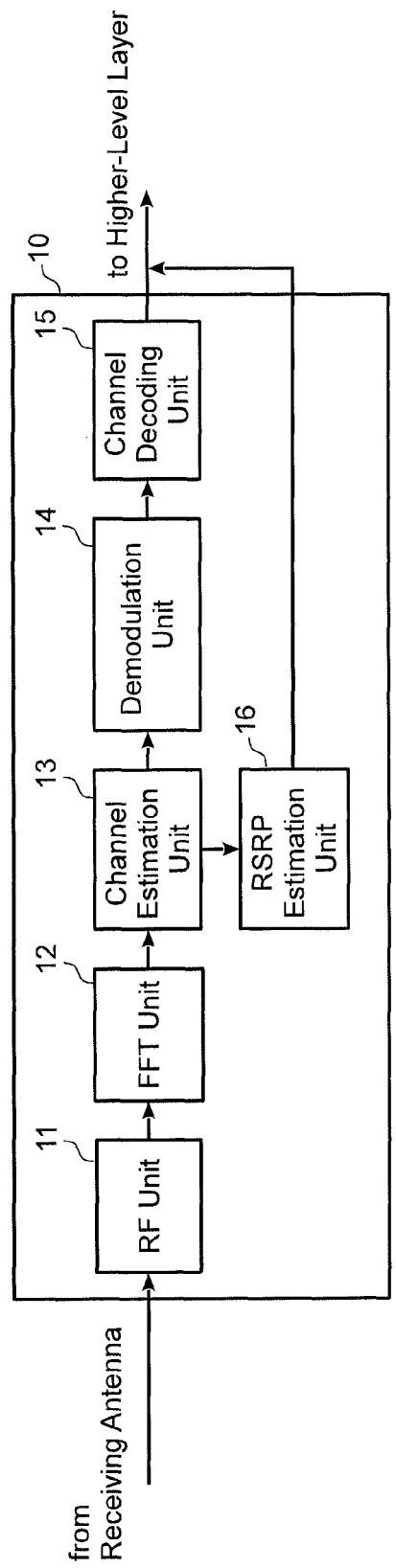
FIG. 1 is a block diagram showing a configuration example of a receiver according to an embodiment of the present invention.

FIG. 1 is a block diagram showing a configuration example of a receiver according to an embodiment of the present invention. On this occasion, explanation is made, while using LTE standardized in 3GPP as an example. Nevertheless, the present invention is not limited to LTE. Incidentally, reference signal received power to be estimated in the case of LTE is called RSRP. Then, a term "RSRP" is used in the explanation below.

A receiver 10 shown in FIG. 1 includes: an RF (Radio Frequency) unit 11, an FFT (Fast Fourier Transformation) unit 12, a channel estimation unit 13, a demodulation unit 14, a channel decoding unit 15, and an RSRP estimation unit 16.

Through a receiving antenna (not shown), the receiver 10 receives information concurrently transmitted from a base station by using a plurality of sub-carriers. The RF unit 11 analog-digital-converts a signal received through the receiving antenna. The FFT unit 12 breaks down the received signal, which has already been converted into digital data, into data of frequency-wise components by way of Fourier Transformation. The channel estimation unit 13 calculates a channel estimation value with respect to each of a plurality of sub-carriers by using a known signal (Reference Signal), which has already been mapped on a frequency-wise resource, in order to create a channel estimation value matrix representing a channel status. On the basis of the channel estimation matrix and the like, estimated by the channel estimation unit 13, the demodulation unit 14 demodulates with respect to the received signal from I-Q components into likelihood information. The channel decoding unit 15 carries out error-correction decoding and error detection. Working as a unit for estimating reference signal received power, the RSRP estimation unit 16 estimates RSRP on the basis of the channel estimation matrix estimated by the channel estimation unit 13. Then, after a filtering process by a higher-level layer, the RSRP estimation unit 16 gives feedback to the base station.

In the case of a narrow band in which the number of sub-carriers to be used for concurrent transmission is smaller than a predetermined value, the RSRP estimation unit 16 in RSRP estimation carries out processes in an order of time-wise in-phase addition, frequency-wise averaging, and conjugate multiplication, with respect to channel estimation values estimated by the channel estimation unit 13. On the other hand, in the case of a wide band in which the number of sub-carriers to be used for the concurrent transmission is greater than the predetermined value, the RSRP estimation unit 16 carries out processes in an order of frequency-wise averaging, conjugate multiplication, and time-wise in-phase addition, with respect to the channel estimation values estimated by the channel estimation unit 13. These processes are described below in detail.

(Operation of the RSRP Estimation Unit 16)

Figure 2:
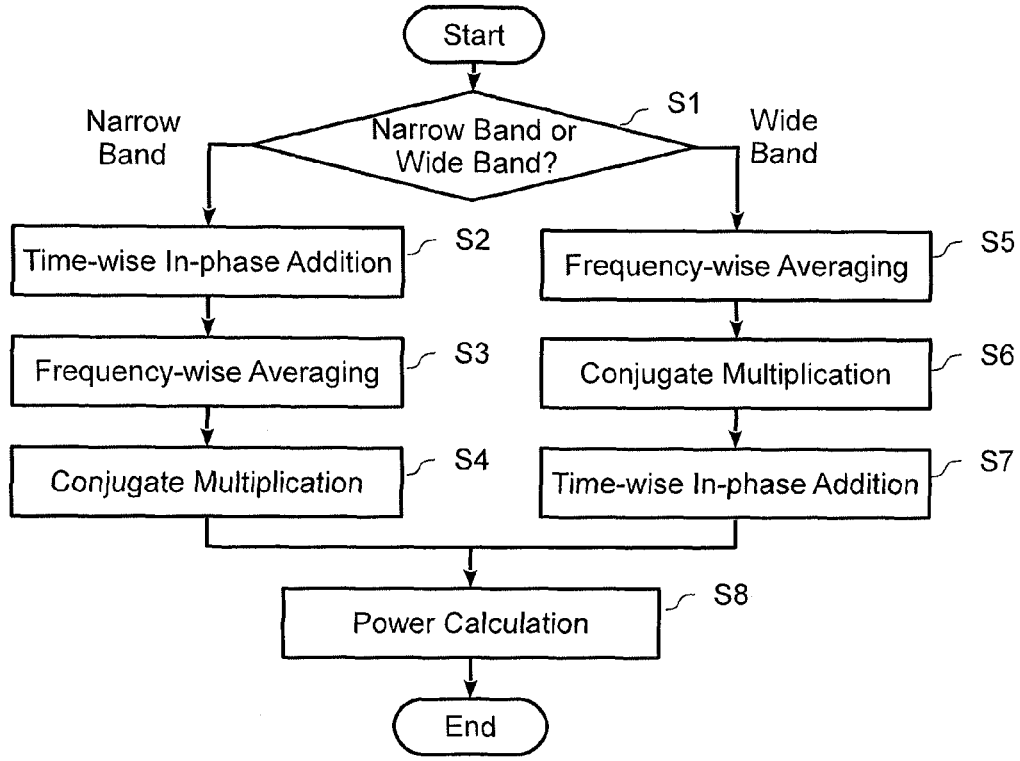
FIG. 2 is a drawing that shows a workflow of estimating RSRP by an RSRP estimation unit in the receiver shown in FIG. 1.

FIG. 2 is a drawing that shows a workflow of RSRP estimation by the RSRP estimation unit 16 in the receiver 10 shown in FIG. 1.

At first, the RSRP estimation unit 16 makes a judgment according to bandwidth information corresponding to the number of sub-carriers to be used whether a transmission band is a narrow band or a wide band. For example, if the number of sub-carriers to be used is smaller than the predetermined value, the transmission band is judged to be a narrow band, and on the other hand if the number of sub-carriers to be used is greater than the predetermined value, the transmission band is judged to be a wide band. Incidentally, the predetermined value that works as a criterion this time can arbitrarily be specified in advance. When having judged the transmission band to be a narrow band, the RSRP estimation unit 16 executes a Step S2 through a Step S4 as steps for a narrow band. On the other hand, when having judged the transmission band to be a wide band, the RSRP estimation unit 16 executes a Step S5 through a Step S7 as steps for a wide band.

(Steps for a Narrow Band)

In the case of executing steps for a narrow band, at first the RSRP estimation unit 16 carries out the time-wise in-phase addition as described below by using channel estimation values "$h_{ZF}$" after zero forcing, which the channel estimation unit 13 has estimated (Step S2):

$$h_{SUM\_T}(a, b, N, i) = \frac{1}{M} \sum_{n=N}^{N+M-1} h_{ZF}(a, b, n, i) \qquad \{\text{Math. 1}\}$$

where, "a" represents a receiving antenna, "b" represents a transmission antenna, "n" is a slot number, "i" is an index number of a reference signal, "N" is a slot number for starting measurement, and "M" shows the number of slots for which the in-phase addition is carried out.

Subsequently, the RSRP estimation unit 16 carries out the frequency-wise averaging with respect to a result of the time-wise in-phase addition, as described below (Step S3):

$$h_{SUM\_Fave}(a, b, N, i) = \quad \{\text{Math. 2}\}$$

$$\begin{cases} h_{SUM\_T}(a, b, N, 0) & \text{for } i = 0 \\ \dfrac{1}{2}\left\{\begin{array}{l} h_{SUM\_T}(a, b, N, i-1) + \\ h_{SUM\_T}(a, b, N, i) \end{array}\right\} & \text{for } i = 1 \ldots N_{RS} - 1 \\ h_{SUM\_T}(a, b, N, N_{RS}) & \text{for } i = N_{RS} \end{cases}$$

where, "$N_{RS}$" represents the number of reference signals included in the band.

Next, the RSRP estimation unit 16 carries out the conjugate multiplication between neighboring reference signals, as described below (Step S4):

$$h_{SUM}(a, b, N) = \frac{1}{N_{RS}-1} \sum_{i=0}^{N_{RS}-2} h_{SUM\_Fave}(a, b, N, i) \times \quad \{\text{Math. 3}\}$$

$$h_{SUM\_Fave}(a, b, N, i+2)^*$$

(Steps for a Wide Band)

In the case of executing steps for a wide band, at first the RSRP estimation unit 16 carries out the frequency-wise averaging as described below by using the channel estimation values "$h_{ZF}$" after zero forcing, which the channel estimation unit 13 has estimated (Step S5):

$$h_{SUM\_Fave}(a, b, n, i) = \quad \{\text{Math. 4}\}$$

$$\begin{cases} h_{ZF}(a, b, n, 0) & \text{for } i = 0 \\ \dfrac{1}{2}\{h_{ZF}(a, b, n, i-1) + h(a, b, n, i)\} & \text{for } i = 1 \ldots N_{RS}-1 \\ h_{ZF}(a, b, n, N_{RS}) & \text{for } i = N_{RS} \end{cases}$$

Subsequently, the RSRP estimation unit 16 carries out the conjugate multiplication between neighboring reference signals, as described below (Step S6):

$$h_{conf}(a, b, n) = \quad \{\text{Math. 5}\}$$

$$\frac{1}{N_{RS}-1} \sum_{i=0}^{N_{RS}-2} h_{SUM\_Fave}(a, b, n, i) \times h_{SUM\_Fave}(a, b, n, i+2)^*$$

Next, the RSRP estimation unit 16 carries out the time-wise in-phase addition, as described below (Step S7):

$$h_{SUM}(a, b, N) = \frac{1}{M} \sum_{n=N}^{N+M-1} h_{conf}(a, b, n) \quad \{\text{Math. 6}\}$$

(Power Calculation Step)

With respect to the result of the in-phase addition for the channel estimation values, calculated through the steps for each of a narrow band and a wide band, the RSRP estimation unit 16 carries out a power calculation step at the end, as described below (Step S8):

$$RSRP = \frac{1}{N_{rx}N_{tx}} \sqrt{\sum_{a=0}^{N_{rx}-1} \sum_{b=0}^{N_{tx}-1} |h_{SUM}(a, b, N)|^2} \quad \{\text{Math. 7}\}$$

where, "$N_{rx}$" and "$N_{tx}$" represent the number of receiving antennas and the number of transmission antennas, respectively.

(Advantageous Effect of the Present Embodiment)

According to the embodiment described above, the channel estimation values are in-phase-added in a time-wise direction. Therefore, even when the transmission band is a narrow band, the number of samples to be used for estimating RSRP can be increased. Moreover, since the channel estimation values are averaged in a frequency-wise direction, noise reduction can be done efficiently. In other words, an accuracy of estimating RSRP can be improved.

Furthermore, in the case of a wide band, in which a lot of samples can be used for the in-phase addition, the averaging operation in the frequency-wise direction (averaging between sub-channels) is carried out in advance. Therefore, the amount of buffering data in the receiver 10 is reduced; and as a result, the size of a RAM of the receiver 10 can be reduced.

(Modifications)

In the embodiment described above, the channel estimation values after zero forcing are used for calculating RSRP. Meanwhile, alternatively channel estimation values after a noise suppression process and the like, or channel estimation values after interpolation in the frequency-wise direction may be used.

Figure 3:
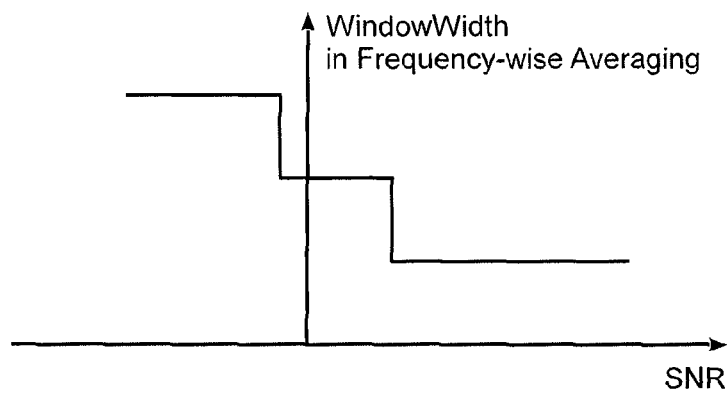
FIG. 3 is a drawing for explaining control of changing a window width of a frequency-wise averaging process in the RSRP estimation unit of the receiver shown in FIG. 1, according to a signal-to-noise ratio.

In the embodiment described above, an average value of neighboring two reference signals is calculated at the time of the frequency-wise averaging. Meanwhile, alternatively the number of reference signals (window width) to be used for the averaging may be three or greater. Moreover, the window width for the frequency-wise averaging may be controlled so as to change in accordance with a signal receiving status, on the basis of an index with regard to the signal receiving status calculated separately, for example, such as a Signal to Noise power Ratio (SNR), as FIG. 3 shows; in such a way that the window width becomes narrower if the signal receiving status is better than a predetermined threshold, and meanwhile the window width becomes wider if the signal receiving status is worse than the predetermined threshold. The threshold can be specified with any optional value according to an actual status at the time.

Figure 4:
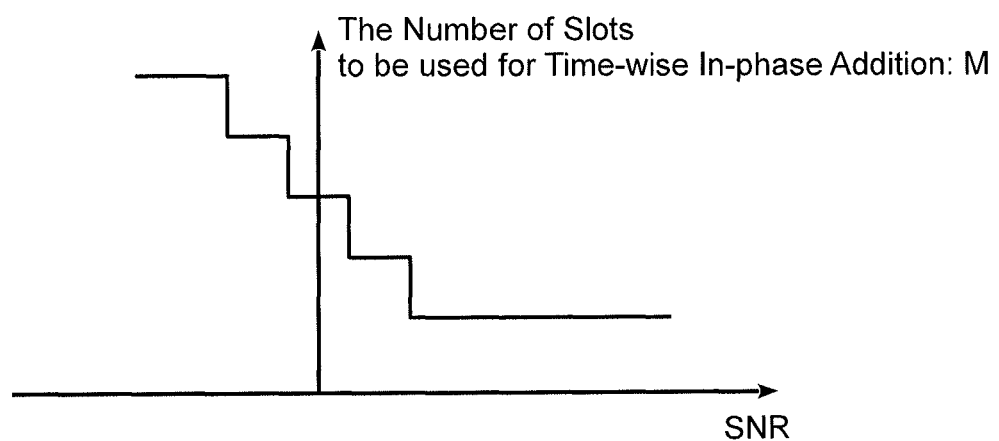
FIG. 4 is a drawing for explaining control of changing the number of time-wise in-phase addition slots 'M' in the RSRP estimation unit of the receiver shown in FIG. 1, according to a signal-to-noise ratio.
Figure 5:
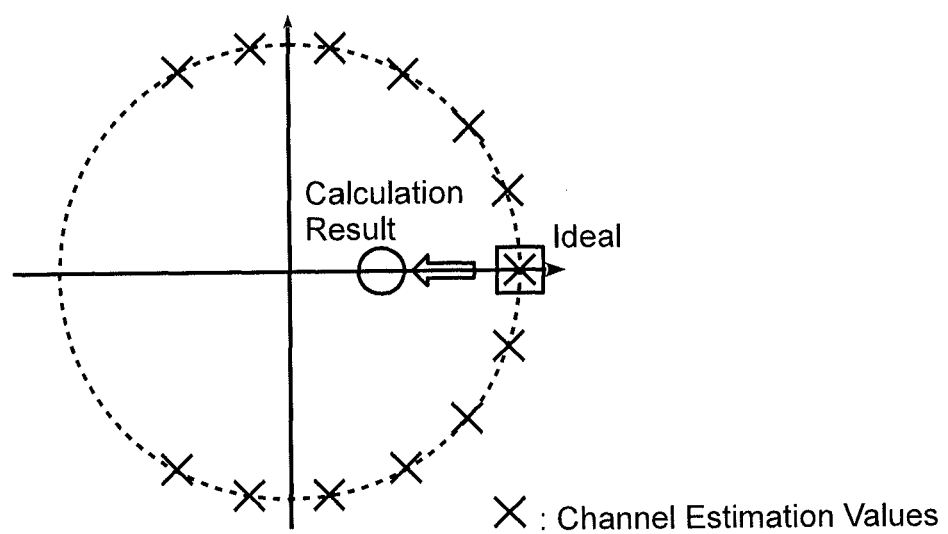
FIG. 5 is a drawing for explaining a situation in which RSRP is estimated to be smaller than it should actually be.

Furthermore, dynamic control may be carried out with respect to the number of slots for time-wise in-phase addition, on the basis of the index with regard to the signal receiving status calculated separately, such as the SNR, as FIG. 4 shows; in such a way that the number of slots to be used for time-wise in-phase addition is reduced if the signal receiving status is better than a predetermined threshold, and meanwhile the number of slots to be used is increased if the signal receiving status is in poor condition. The threshold can be specified with any optional value according to an actual status at the time. Thus, when the signal receiving status is in good condition, a time period required for an RSRP measurement can be shortened so that, as a result, power consumption of the receiver can be reduced.

Although an explanation described above is made by using a case of communication of a mobile phone making use of LTE as an example, the same technique can be applied to a mobile phone making use of OFDM and FDM, as well as a wireless communication system, such as PHS, wireless LAN, and the like.

The invention claimed is:

1. A receiver for receiving information transmitted concurrently by using a plurality of sub-carriers, comprising:
    a channel estimation unit for calculating a channel estimation value with respect to each of the plurality of sub-carriers; and
    an RSRP estimation unit for estimating a reference signal received power of the information on the basis of channel estimation values calculated by the channel estimation unit;
    wherein, in the case of a narrow band in which the number of sub-carriers to be used for the concurrent transmission is smaller than a predetermined value, the RSRP estimation unit carries out processes in an order of time-wise in-phase addition, frequency-wise averaging, and conjugate multiplication, with respect to the channel estimation values estimated by the channel estimation unit; and
    in the case of a wide band in which the number of sub-carriers to be used for the concurrent transmission is greater than the predetermined value, the RSRP estimation unit carries out processes in an order of frequency-wise averaging, conjugate multiplication, and time-wise in-phase addition, with respect to the channel estimation values estimated by the channel estimation unit.

2. The receiver according to claim 1:
    wherein, on the basis of an index with regard to a signal receiving status, the RSRP estimation unit narrows the window width for the frequency-wise averaging if the signal receiving status is better than a predetermined threshold, and meanwhile widens the window width for the frequency-wise averaging if the signal receiving status is worse than the predetermined threshold.

3. The receiver according to claim 1:
    wherein, on the basis of an index with regard to a signal receiving status, the RSRP estimation unit reduces the number of slots to be used for the time-wise in-phase addition if the signal receiving status is better than a predetermined threshold, and meanwhile increases the number of slots to be used for the time-wise in-phase addition if the signal receiving status is worse than the predetermined threshold.

4. The receiver according to claim 2:
    wherein a signal-to-noise ratio is used as the index with regard to the signal receiving status.

5. A method of estimating a reference signal received power of information after receiving the information transmitted concurrently by using a plurality of sub-carriers, comprising:
    carrying out processes in an order of time-wise in-phase addition, frequency-wise averaging, and conjugate multiplication, with respect to a channel estimation value for each of the sub-carriers, in the case of a narrow band in which the number of sub-carriers to be used for the concurrent transmission is smaller than a predetermined value; and
    carrying out processes in an order of frequency-wise averaging, conjugate multiplication, and time-wise in-phase addition, with respect to a channel estimation value for each of the sub-carriers, in the case of a wide band in which the number of sub-carriers to be used for the concurrent transmission is greater than the predetermined value.

6. The receiver according to claim 2:
    wherein, on the basis of an index with regard to a signal receiving status, the Reference Signal Received Power estimation unit reduces the number of slots to be used for the time-wise in-phase addition if the signal receiving status is better than a predetermined threshold, and meanwhile increases the number of slots to be used for the time-wise in-phase addition if the signal receiving status is worse than the predetermined threshold.

7. The receiver according to claim 3: wherein a signal-to-noise ratio is used as the index with regard to the signal receiving status.

8. The receiver according to claim 6: wherein a signal-to-noise ratio is used as the index with regard to the signal receiving status.

* * * * *